(12) United States Patent
Arzt et al.

(10) Patent No.: US 11,873,849 B2
(45) Date of Patent: Jan. 16, 2024

(54) SHAPED BODY HAVING A STRUCTURED SURFACE FOR REVERSIBLE ADHESION

(71) Applicant: INNOCISE GmbH, Saarbrücken (DE)

(72) Inventors: Eduard Arzt, Saarbrücken (DE); Karsten Moh, Blieskastel-Brenschelbach (DE); Martin Schmitz, Sulzbach (DE)

(73) Assignee: INNOCISE GmbH, Saarbrücken (DE)

( * ) Notice: Subject to any disclaimer, the term of this patent is extended or adjusted under 35 U.S.C. 154(b) by 0 days.

(21) Appl. No.: 16/957,765

(22) PCT Filed: Dec. 10, 2018

(86) PCT No.: PCT/EP2018/084103
§ 371 (c)(1),
(2) Date: Jun. 25, 2020

(87) PCT Pub. No.: WO2019/129476
PCT Pub. Date: Jul. 4, 2019

(65) Prior Publication Data
US 2021/0062839 A1   Mar. 4, 2021

(30) Foreign Application Priority Data
Dec. 27, 2017   (DE) .................... 10 2017 131 344.3

(51) Int. Cl.
*B32B 33/00*     (2006.01)
*F16B 5/07*      (2006.01)
*F16B 47/00*     (2006.01)

(52) U.S. Cl.
CPC ............ *F16B 5/07* (2013.01); *F16B 47/00* (2013.01)

(58) Field of Classification Search
CPC .................................. F16B 47/00; F16B 5/07
See application file for complete search history.

(56) References Cited

U.S. PATENT DOCUMENTS

| | | | | |
|---|---|---|---|---|
| 8,398,909 | B1* | 3/2013 | Sitti | ........................ B29C 39/24 264/255 |
| 10,390,997 | B2* | 8/2019 | Tuma | ................ A61F 13/00025 |
| 2005/0148984 | A1* | 7/2005 | Lindsay | .............. A61F 13/5611 604/387 |
| 2006/0005362 | A1 | 1/2006 | Arzt et al. | |
| 2008/0280085 | A1* | 11/2008 | Livne | ........................ C09J 7/20 428/40.1 |
| 2010/0136281 | A1 | 6/2010 | Sitti et al. | |

(Continued)

FOREIGN PATENT DOCUMENTS

| | | |
|---|---|---|
| DE | 102014119470 A1 | 6/2016 |
| EP | 1699403 B1 | 8/2012 |

(Continued)

OTHER PUBLICATIONS

English Abstract for WO03099951 A2, Dec. 4, 2003.

(Continued)

*Primary Examiner* — Amy J. Sterling
(74) *Attorney, Agent, or Firm* — CAHN & SAMUELS, LLP

(57) ABSTRACT

A molded body with a structured surface for reversible adhesion to surfaces includes projections having an aspect ratio of up to 10. The structure can be easily detached from the surface by a lateral movement.

21 Claims, 4 Drawing Sheets

(56) References Cited

U.S. PATENT DOCUMENTS

| | | | |
|---|---|---|---|
| 2012/0107570 A1* | 5/2012 | Ross | C09J 7/00 156/72 |
| 2016/0257857 A1 | 9/2016 | Sitti et al. | |
| 2018/0051187 A1 | 2/2018 | Hensel et al. | |
| 2018/0223886 A1 | 8/2018 | Kroner et al. | |
| 2021/0071045 A1 | 3/2021 | Artz et al. | |
| 2021/0071046 A1 | 3/2021 | Artz et al. | |

FOREIGN PATENT DOCUMENTS

| | | | |
|---|---|---|---|
| JP | 2008201883 A | 9/2008 | |
| JP | 2012045748 A | 12/2012 | |
| JP | 2016168063 A | 9/2016 | |
| WO | 03099951 A2 | 12/2003 | |
| WO | 2016146792 A1 | 9/2016 | |
| WO | 2019129540 A1 | 7/2019 | |

OTHER PUBLICATIONS

International Search Report for Application No. PCT/EP2018/084103, dated Mar. 29, 2019.
International International Preliminary Report on Patentability for Application No. PCT/EP2018/084103, dated Jul. 2020.
English Abstract for WO2019129540 A1, Jul. 4, 2019.
Bacca, et al., "Load Sharing in Bioinspired Fibrillar Adhesives With Backing Layer Interactions and Interfacial Misalignment," Journal of the Mechanics and Physics of Solids, 96, 2016, 428-44.
English Abstract for JP2008201883 A, Sep. 4, 2008.
English Abstract for JP2012045748 A, Dec. 13, 2012.
English Abstract for JP2016168063 A, Sep. 23, 2016.

\* cited by examiner

SHAPED BODY HAVING A STRUCTURED SURFACE FOR REVERSIBLE ADHESION

This patent application is a U.S. national stage application of PCT international application PCT/EP2018/084103 filed on 10 Dec. 2018 and claims priority of German patent document 10 2017 131 344.3 filed on 27 Dec. 2017, the entireties of which are incorporated herein by reference.

FIELD OF THE INVENTION

The invention relates to a molded body with a structured surface for reversible adhesion of objects or to surfaces, and to a method for the detachment of such structures. The molded body can be easily detached again from the objects or surfaces.

BACKGROUND OF THE INVENTION

The molecular adhesion between two objects can be reinforced or controlled by fiber-like surface structures. This principle is known as the gecko effect. If a structured elastomer surface is pressed with a certain pressing-on force against a comparatively flat surface, van der Waals interactions can take place. Reversible adhesion, that is to say the possibility of switching attachment and detachment in a targeted manner, is also known from nature. However, whereas the gecko achieves detachment by a peeling of its setae, this is frequently not possible for technical structures and usually only expedient when shear adhesion, that is to say adhesion in the direction of the substrate surface/object surface, is intended to be used. In the case of so-called normal adhesion, that is to say an adhesive force perpendicular to the object surface, detachment has to be initiated in some other way.

The aim is to vary the effective contact area between the adhesive structures and the object surface in a targeted manner, in order to switch between adhesion (large contact area) and detachment (small contact area) and thus to facilitate selective detachment.

It is known that, when using structures with a high aspect ratio, for example >3, it is possible to use so-called Euler buckling for detachment from a substrate. It is known that the reduction in the contact area can be brought about by buckling of projections under compressive loading. With sufficient compressive loading, elastic instability leads to the buckling of the projections. This is also referred to as Euler buckling. The critical force is:

$$F=(n\pi/L)^2 EI$$

Here, E is the modulus of elasticity, I is the area moment of inertia, L is the length (height) of the projection, and n is a preliminary factor in dependence on the mechanical clamping in of the projection. The area moment of inertia in a cylindrical structure is $I=\pi d^4/64$. This results in the following relationship: projections with a large height, small diameter or small modulus of elasticity buckle under smaller forces than projections with a short length, large diameter or high modulus of elasticity. Here, additional pressure in the direction of the object results in the buckling of the structure and thus the reduction in the contact area with the surface. A disadvantage here is that the structures have to have a high aspect ratio. Said structures are therefore difficult to produce and tend toward instability. Depending on the object, a pressure in the direction of the object is also disadvantageous for detachment in the case of sensitive objects.

The problem addressed by the invention is that of providing a structure which, particularly in the case of normal adhesion, makes simple selective detachment possible, and also a method for the detachment of such structures.

SUMMARY OF THE INVENTION

Said problem is solved by the inventions by means of the features of the independent claims. Advantageous developments of the inventions are specified in the subclaims. The wording of all the claims is hereby incorporated in the content of this description by reference. The inventions also encompass all expedient and in particular all mentioned combinations of independent and/or dependent claims.

The problem is solved by a molded body with a structured surface, the surface having a structuring comprising a multiplicity of projections (pillars) which at least each have a stem and comprise an end face which faces away from the surface. It is with said end face that the projections come into contact with the surface of the adhering object.

The modulus of elasticity of the projections is preferably constant, but can also have an axial or lateral gradient.

Surprisingly, it has now been found that projections with an aspect ratio of below 10 can be detached particularly easily. For instance, said projections can be deformed by a shear loading parallel to the adhesive surface. The projections are deformed in a manner dependent on their flexural rigidity (E*I). As a result, the adhesion force is likewise reduced and the structure is detached. This is not dependent on the shear strength of the adhesive connection, but rather the deformation of the structures leads to the reduction of the adhesion force. Structures which can be easily bent can be easily detached by way of this mechanism. The shear loading can be brought about by an arbitrary movement parallel to the surface. This can be a linear movement or a rotation. The advantage of the detachment by shear loading is that pressure does not need to be exerted perpendicular to the adhesive surface, like for the release by means of Euler buckling.

In the case of said structures, it is thus possible to bend them by displacing the structured surface parallel to the surface of the object, such that the end faces detach from the surface and the adhesion is reduced.

The perpendicular height of the end face is understood to mean the distance of the end face from the surface on which the projections are arranged.

In a preferred embodiment of the invention, the projections of the structured surface of the invention are configured in a column-like manner. This means that they are preferably projections which are configured perpendicularly with respect to the surface and which have a stem and an end face, it being possible for the stem and the end face to have any desired cross section (for example circular, oval, rectangular, square, diamond-shaped, hexagonal, pentagonal, etc.).

The projections are preferably configured such that the perpendicular geometric projection of the end face onto the base of the projection forms an overlapping area with the base, with the overlapping area and the geometric projection of the overlapping area onto the end face spanning a body which lies completely within the projection. In a preferred embodiment of the invention, the overlapping area covers at least 50% of the base, preferably at least 70% of the base, particularly preferably the overlapping area covers the entire base. The projections are therefore preferably not inclined, but can be.

In a preferred embodiment, the end face is oriented parallel to the base and to the surface. If the end faces are not oriented parallel to the surface and therefore have different perpendicular heights, the mean perpendicular height of the end face is considered to be the perpendicular height of the projection.

In one embodiment, the end face of the projections is larger than the base.

In a preferred embodiment of the invention, the stem of the projection, with respect to its mean diameter, has an aspect ratio of height to diameter of 1 to 10, preferably of 1 to 5, particularly preferably between 1 and 3.

In one embodiment, the aspect ratio is up to 5, in particular up to 3. Such structures cannot be detached by way of Euler buckling without high loading for the object.

The mean diameter is in this case understood to mean the diameter of the circle which has the same area as the corresponding cross section of the projection, averaged over the entire height of the projection.

In a further embodiment of the invention, at a certain height over the entire height of the projection, the ratio of the perpendicular height of a projection to the diameter is always 1 to 10, preferably 1 to 5, particularly preferably between 1 and 3. In one embodiment, said aspect ratio is up to 5, in particular up to 3. This preferably also applies to the minimum diameter of the projections. This is relevant if the projections have a minimum and a maximum diameter, for example in the case of an oval base.

The projections can have widened end faces, so-called mushroom structures.

The end faces of the projections can themselves be structured in order to increase their surface. In this case, the mean perpendicular height of the end face is considered to be the perpendicular height of the projections.

In a preferred embodiment, the perpendicular height of all projections lies in a range from 1 μm to 10 mm, preferably 1 μm to 5 mm, in particular 1 μm to 2 mm, preferably in a range from 1 μm to 2 mm.

In a preferred embodiment, the base corresponds in terms of area to a circle with a diameter of between 0.1 μm and 5 mm, preferably 0.1 μm and 2 mm, in particular preferably of between 1 μm and 500 μm, particularly preferably of between 1 μm and 450 μm. In one embodiment, the base is a circle with a diameter of between 0.3 μm and 2 mm, preferably 1 μm and 450 μm, preferably 10 to 450 μm.

The mean diameter of the stems lies preferably between 0.1 μm and 5 mm, preferably 0.1 μm and 2 mm, in particular preferably between 1 μm and 450 μm, preferably 10 μm to 450 μm. Preferably, the height and the mean diameter are adapted to correspond to the preferred aspect ratio.

By way of example, structures according to the invention have a diameter of 300 to 500 μm, with a perpendicular height of 600 μm to 2.5 mm, the aspect ratio not exceeding 10, preferably 5.

By way of example, structures according to the invention have a diameter of 10 to 100 μm, with a perpendicular height of 20 μm to 500 μm, the aspect ratio not exceeding 7, preferably 5.

In one embodiment, these can be for example structures with a diameter of 300 μm to 500 μm and a height of 700 μm to 1500 μm, for example a diameter of 400 μm with a height of 800 μm or 1200 μm.

In another embodiment, these can be structures with a diameter of 10 μm to 100 μm and a height of 10 μm to 100 μm, the aspect ratio of 7, preferably 5, not being exceeded. These are for example structures with a diameter of 10 μm to 60 μm and a height of 30 μm to 60 μm, preferably a diameter of 15 μm to 50 μm with a height of 40 μm to 50 μm. Precisely such small projections with a low aspect ratio can be produced in a simple manner.

In a preferred embodiment, in the case of widened end faces, the surface of the end face of a projection is at least 1.01 times, preferably at least 1.4 times, as large as the area of the base of a projection. It can be greater by the factor of 1.01 to 20, for example.

In a further embodiment, the end face is between 5% and 100% greater than the base, particularly preferably between 10% and 50% of the base.

In a preferred embodiment, the distance between two projections is less than 2 mm, in particular less than 1 mm.

The projections are preferably arranged periodically in a regular pattern.

The modulus of elasticity of all regions of the projection is preferably 50 kPa to 3 GPa. Preferably, the modulus of elasticity of soft regions, that is to say in particular of the region comprising the end face, is 50 kPa to 20 MPa, preferably 100 kPa to 10 MPa. Independently thereof, the modulus of elasticity of the regions with a high modulus of elasticity is preferably 1 MPa to 3 GPa, preferably 2 MPa to 1 GPa. Preferably, for all of the softer and harder regions, the moduli of elasticity lie in the ranges specified above. Preferably, the modulus of elasticity of the regions of the projection decreases in the direction of the end face.

The elasticity of the projections can also be defined by way of the hardness of the material used, preferably an elastomer. The material of the projections preferably has a hardness of Shore A 20 to Shore A 80, preferably Shore A 30 to Shore A 70.

The projections can be composed of a large number of different materials, preferably being elastomers, particularly preferably thermoplastic elastomers. For higher moduli of elasticity, use can also be made of thermosets.

The projections can therefore comprise the following materials:

epoxy-based and/or silicone-based elastomers, thermoplastic elastomers (TPE), polyurethanes, epoxy resins, acrylate systems, methacrylate systems, polyacrylates as homopolymers and copolymers, polymethacrylates as homopolymers and copolymers (PMMA, AMMA acrylonitrile/methyl methacrylate), polyurethane (meth)acrylates, silicones, silicone resins, rubber, such as R rubber (NR natural rubber, IR polyisoprene rubber, BR butadiene rubber, SBR styrene-butadiene rubber, CR chloroprene rubber, NBR nitrile rubber), M rubber (EPM ethene-propene rubber, EPDM ethylene-propylene rubber), unsaturated polyester resins, formaldehyde resins, vinyl ester resins, polyethylenes as homopolymers or copolymers, and also mixtures and copolymers of the aforementioned materials. Preference is also given to elastomers which are approved for use in the fields of packaging, pharmaceuticals and foods by the EU (in accordance with EU regulation no. October 2011 of Jan. 4, 2011, published on Jan. 15, 2011) or FDA, or silicone-free UV-curable resins from PVD and CVD processing technology. In this case, polyurethane (meth)acrylates represent polyurethane methacrylates, polyurethane acrylates, and also mixtures and/or copolymers thereof.

Preference is given to epoxy-based and/or silicone-based elastomers, polyurethanes, silicones, silicone resins (such as UV-curable PDMS), polyurethane (meth)acrylates, rubber (such as EPM, EPDM).

The structured surface can also have projections which are capable of shear adhesion. This can support the adhesion if the molded body, along with the object adhering to it, are rotated in space such that additional forces, for example gravitational forces, arise, which could adversely affect the adhesive force of the molded body according to the invention.

The invention also relates to an arrangement comprising at least two of the molded bodies according to the invention, which are arranged such that they can contact a common surface alongside one another, and they are also individually displaceable at least laterally with respect to the common surface.

The invention also relates to a method for the reversible adhesion of a molded body according to the invention or of an arrangement of molded bodies to a surface.

Individual method steps are described in more detail below. The steps do not necessarily have to be performed in the order specified, and the method to be described can also have further steps which are not stated.

To this end, end faces of the projections of the molded body according to the invention are contacted with the surface, such that an adhesive bond forms between the molded body and the surface.

For the detachment of the molded body, the molded body is displaced at least laterally relative to the surface. For this purpose, it may be necessary to fix the surface, or the object with said surface, so that a relative movement of the molded body can occur.

As a result of said movement, the projections bend, which leads to the at least partial detachment of the end faces. This reduces the contact area contributing to the adhesion and reduces the adhesive force up until complete detachment.

The relative lateral displacement can be linear, that is to say the molded body is displaced laterally in a direction.

The relative lateral displacement can also be effected circularly. To this end, the molded body is rotated relative to the surface. As a result of said rotation, the loading of the object is more uniform.

On account of the elasticity of the projections, the molded body can subsequently be used again for contacting a surface and thus for dry-adhesive adhesion.

In a further embodiment of the method, a surface is contacted with the end faces of an arrangement comprising at least two molded bodies according to the invention. The contacting is preferably selected such that the molded bodies bind to the surface approximately with the same adhesive force.

The molded bodies do not have to contact the surface directly alongside one another. They can also be arranged at different points of the surface.

For detachment, it is then possible for each of the individual molded bodies of the arrangement to move at least laterally relative to the surface. This is preferably effected in such a way that the lateral moment of the molded bodies acting vectorially on the surface and thus on the object is minimal, ideally equal to 0. As a result, it is not necessary, or is necessary only to a minor extent, to fix the object. Said method is also particularly suitable for sensitive objects. The forces acting on the object are also only small. In the case of two molded bodies, they can both be moved, for example, in opposite directions.

In addition to the lateral component, it is also possible for the movement of the molded body or of the molded bodies of an arrangement to have further components, for example perpendicularly away from the surface or a rotary movement, for example a simultaneously effected rotary movement with one or more axes of rotation parallel to the surface. In this case, the rotation is preferably effected such that a compression of projections does not occur. The molded bodies can be moved for example on a circular track.

As a result of the rotation, it is possible to achieve the situation whereby the end faces of certain projections detach first from the surface.

In the case of an arrangement of molded bodies, it is not necessary for all of the molded bodies to be moved in a uniform manner.

Equally, molded bodies of an arrangement can also be rotated or displaced.

The detaching movement and also the form and elasticity of the projections depend on the adhesive force to be obtained and on the sensitivity of the surface and of the object.

Especially in the case of very small and sensitive component parts, such as microchips, integrated circuits, displays or touchscreens, the method according to the invention with the molded body according to the invention affords possibilities for selective adhesion and detachment without large loading of the object. Said method can also be used to address objects which cannot be picked up by way of a conventional suction device without further measures.

Further details and features emerge from the following description of preferred exemplary embodiments in conjunction with the subclaims. Here, the respective features can be realized on their own or as a plurality in combination with one another. The possibilities of solving the problem are not limited to the exemplary embodiments. Thus, for example, range indications always comprise all—nonstated—intermediate values and all conceivable subintervals.

The exemplary embodiments are schematically illustrated in the figures. Identical reference signs in the individual figures here designate identical or functionally identical elements or elements which correspond to one another in terms of their functions. Specifically:

DETAILED DESCRIPTION OF THE DRAWINGS

Figure 1:
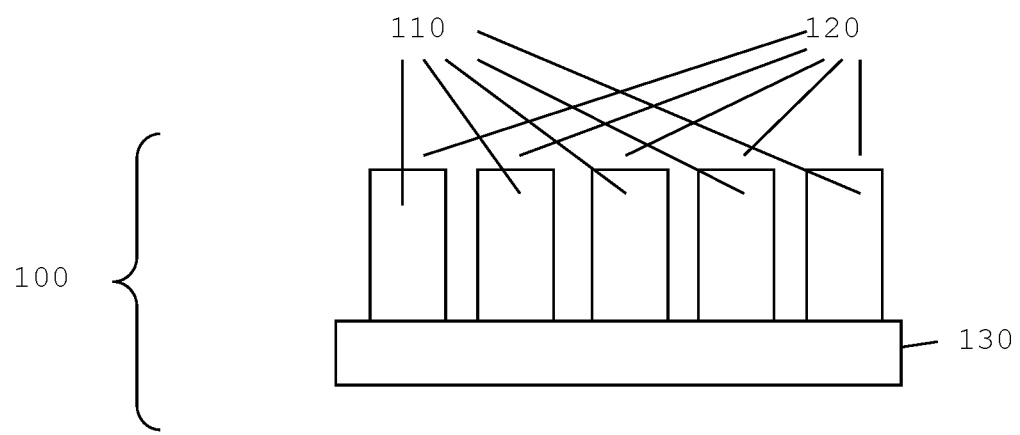
FIG. 1 shows a schematic illustration of a molded body according to the invention.

FIG. 1 shows a schematic illustration of a molded body 100 according to the invention. The molded body 100 has a multiplicity of projections 110 on the surface 130, said projections having end faces 120.

Figure 2:
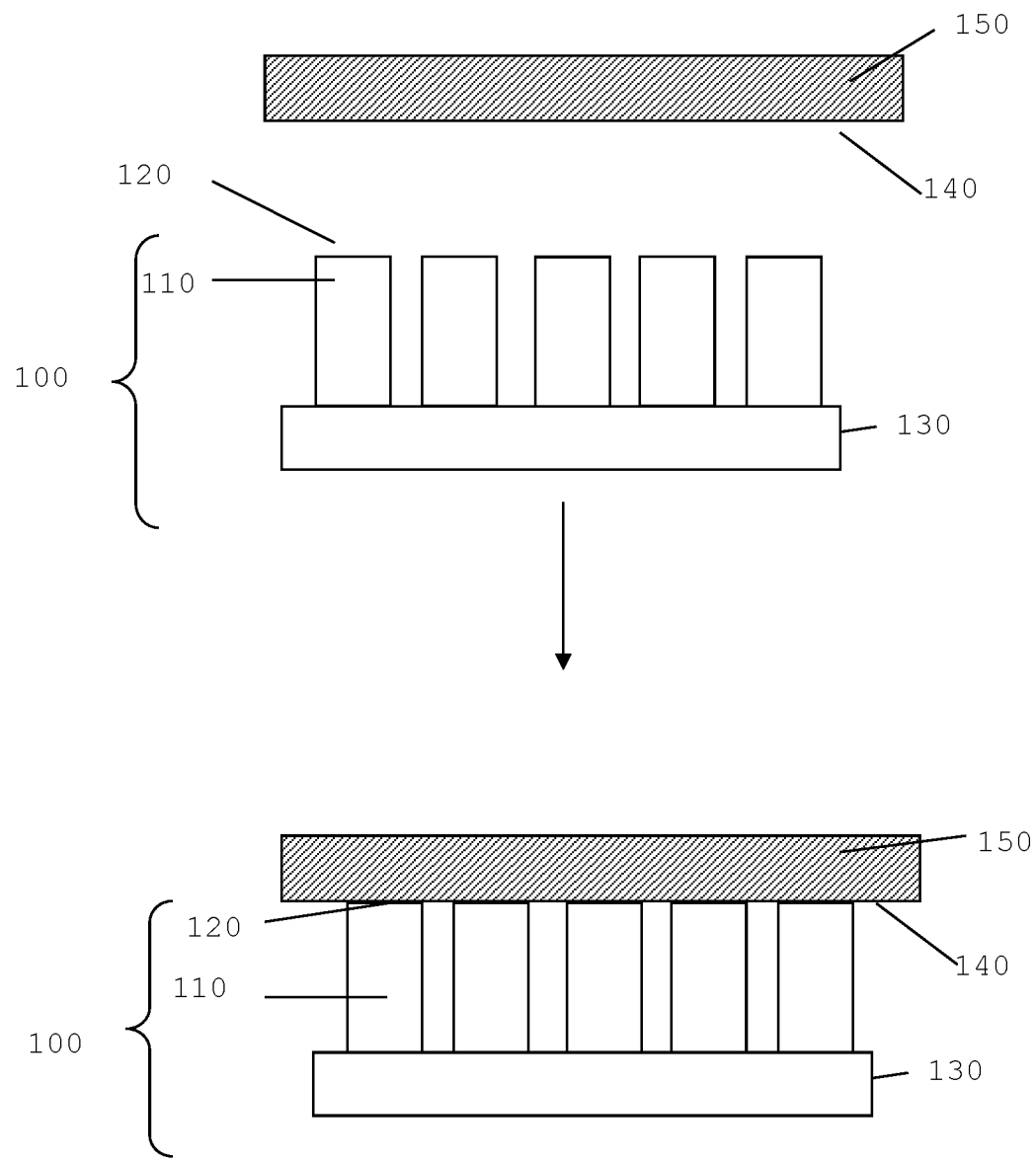
FIG. 2 shows a schematic illustration of the adhesion to a surface.

FIG. 2 shows how a molded body 100 according to the invention is contacted (at the top) with the surface 140 of an object 150. Here, the end faces 120 of the projections 110 come into contact with the surface 140 and said end faces and said surface adhere to one another. The object 150 is then bound to the molded body 100.

Figure 3:
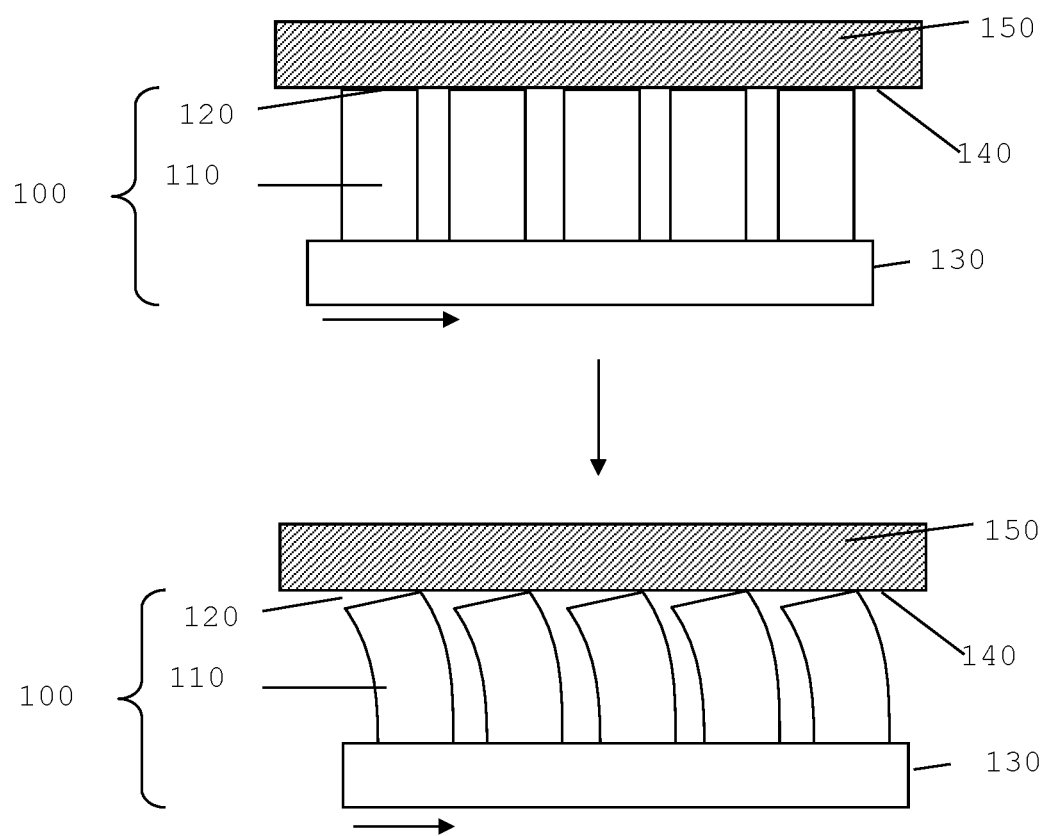
FIG. 3 shows a schematic illustration of the detachment.

FIG. 3 shows the sequence of an embodiment of the detachment of an object 150 from the molded body 100. To this end, the molded body 100 is moved laterally (arrow at the top) relative to the object 150. As a result, stress(es) arise(s) in the projections 110 and the projections 110 bend. This leads to a partial detachment of the end faces 120 from the surface 140 of the object 150. This reduces the contacting area of the end faces 120, and the adhesive force with which the object 150 is bound to the molded body 100 is reduced, possibly until the object 150 has completely disengaged.

Figure 4:
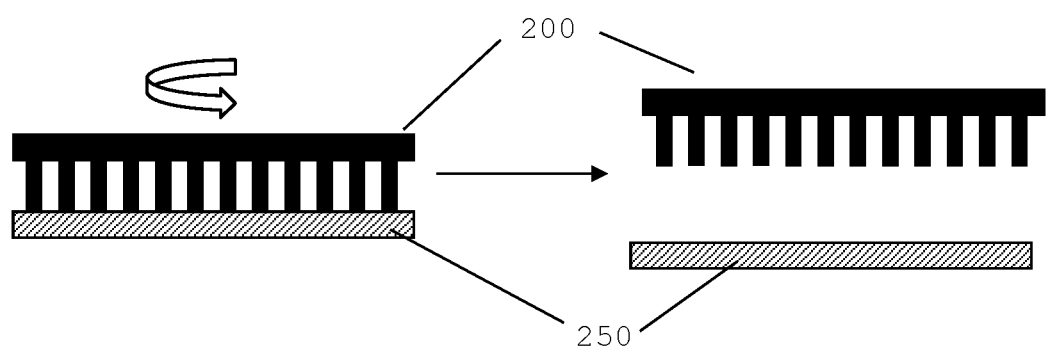
FIG. 4 shows a schematic illustration of an embodiment of the invention.

FIG. 4 shows a further embodiment of the invention. The molded body 200, which is structured in accordance with the invention, is here rotated relative to the object 250. This also results in shear loading and in the detachment by way of bending of the projections.

Figure 5:
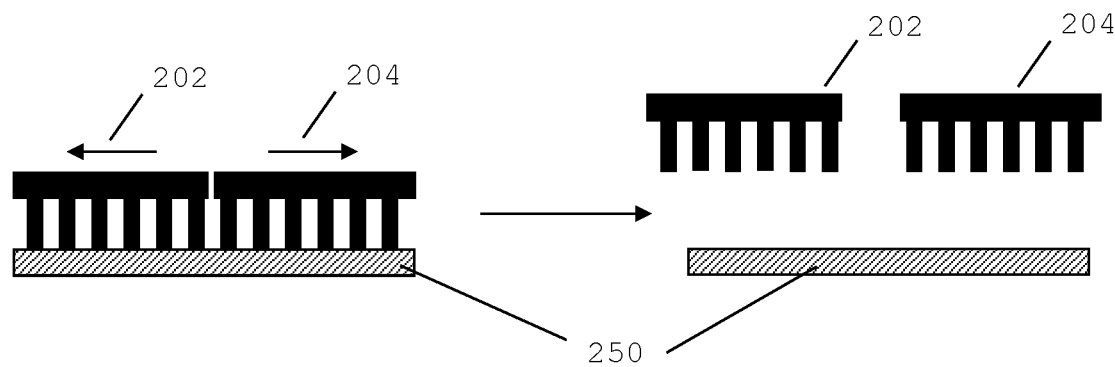
FIG. 5 shows a schematic illustration of an embodiment of the invention.

FIG. 5 shows a further embodiment of the invention. Here, the object 250 is contacted by a plurality of molded bodies 202 and 204, which are structured in accordance with the invention. Said molded bodies 202 and 204 are moved relative to the surface of the object 250. The movement is in this case selected such that the resulting moment, which is transmitted onto the object, is as small as possible. In the example, the two molded bodies are moved in opposite directions. This results in the detachment by way of bending of the projections.

REFERENCE DESIGNATIONS

100 Molded body
110 Projection
120 End face
130 Surface/Backing layer/Rear layer
140 Surface for the adhesion
150 Object
200 Molded body
202 Molded body
204 Molded body
250 Object

The invention claimed is:

1. An arrangement, comprising:
at least two of the molded bodies, each comprising a surface and a structuring comprising a plurality of projections on the surface, each projection having a stem and an end face which faces away from the surface and is perpendicular to the surface, wherein the projections have an aspect ratio of perpendicular height and mean diameter of up to 10,
wherein said at least two molded bodies are arranged such that they contact a common surface alongside one another, form an adhesive bond with the common surface, and are configured to be individually movable laterally parallel to the common surface.

2. A method for the reversible adhesion of a molded body to a surface, comprising:
providing an arrangement comprising at least two molded bodies, each molded body comprising a surface and a structuring comprising a plurality of projections on the surface, each projection having a stem and an end face which faces away from the surface and is perpendicular to the surface, wherein the projections have an aspect ratio of perpendicular height and mean diameter of up to 10, wherein said at least two molded bodies are arranged such that they contact a common surface alongside one another and are configured to be individually movable at least laterally with respect to the common surface;
contacting the end faces with a common surface, such that an adhesive bond forms; and
moving at least one molded body of the arrangement at least laterally relative to the common surface, such that the contact area between the end faces and the common surface is reduced as a result of bending of the projections.

3. The method as claimed in claim 2, wherein all of the molded bodies are moved such that the moment acting on the surface as a result of the lateral movement is minimal.

4. An arrangement as claimed in claim 1, wherein each end face is parallel to the surface.

5. An arrangement as claimed in claim 1, wherein the projections have an aspect ratio of perpendicular height and mean diameter of 1 to 5.

6. An arrangement as claimed in claim 1, wherein the projections have an aspect ratio of perpendicular height and mean diameter of 1 to 3.

7. An arrangement as claimed in claim 1, wherein the projections have an aspect ratio of perpendicular height and mean diameter of up to 3.

8. An arrangement as claimed in claim 1, wherein the projections comprise polyurethane (meth)acrylate having a modulus of elasticity of 50 kPA to 3 GPa.

9. An arrangement as claimed in claim 1, wherein the projections comprise silicone or a silicone resin.

10. An arrangement as claimed in claim 1, wherein the projections comprise polydimethyl siloxane.

11. The method as claimed in claim 2, wherein said moving at least laterally comprises a linear displacement.

12. The method as claimed in claim 2, wherein said moving at least laterally comprises a circular displacement.

13. A method for the reversible adhesion, comprising:
providing at least one molded body comprising a surface and a structuring comprising a plurality of projections on the surface, each projection having a stem and an end face which faces away from the surface and is perpendicular to the surface, wherein the projections have an aspect ratio of perpendicular height and mean diameter of up to 10;
contacting the end faces of the at least one molded body with a surface of an object, such that an adhesive bond forms; and
rotating the at least one molded body, such that a contact area between the end faces and the surface of the object is reduced as a result of bending of the plurality of projections.

14. An arrangement, comprising:
at least two molded bodies, each molded body comprising a surface and a plurality of projections on the surface, each projection having a stem and an end face which faces away from the surface and is perpendicular to the surface, wherein the projections have an aspect ratio of perpendicular height and mean diameter of up to 10,
wherein said at least two molded bodies are arranged such that they contact a common surface of an object, and
wherein said at least two molded bodies are individually movable laterally parallel to the common surface of the object.

15. A method for the reversible adhesion, comprising:
providing at least one molded body comprising a surface and a structuring comprising a plurality of projections on the surface, each projection having a stem and an end face which faces away from the surface and is perpendicular to the surface, wherein the projections have an aspect ratio of perpendicular height and mean diameter of up to 10;
contacting the end faces of the at least one molded body to a surface of an object such that a dry adhesive bond forms; and
rotating the at least one molded body, such that the plurality of projections bend, thereby reducing a contact area between the end faces and the surface of the object.

16. A method as claimed in claim 2, comprising contacting the end faces of a plurality of molded bodies to the common surface, and wherein said moving comprises moving the plurality of molded bodies in opposite directions.

17. The method as claimed in claim 13, comprising rotating and laterally moving the at least one molded body.

18. The arrangement as claimed in claim 14, wherein the at least two molded bodies are arranged side-by-side.

19. The method as claimed in claim 2, wherein said moving at least laterally comprises linear or rotation movement parallel to the common surface.

20. The method as claimed in claim 2, wherein during said moving no pressure is exerted perpendicular to the common surface for detachment of the at least one molded body.

21. The method as claimed in claim 2, wherein said moving at least laterally comprises a circular rotation and compression of the projections does not occur.

\* \* \* \* \*